United States Patent
Sauerlander et al.

(10) Patent No.: US 7,688,600 B2
(45) Date of Patent: Mar. 30, 2010

(54) MULTI-RESONANCE CONVERTER

(75) Inventors: Georg Sauerlander, Aachen (DE);
Reinhold Elferich, Aachen (DE);
Cornelis Schetters, Beuningen (NL);
Humphrey De Groot, Vlijmen (NL)

(73) Assignee: NXP B.V., Eindhoven (NL)

( * ) Notice: Subject to any disclaimer, the term of this patent is extended or adjusted under 35 U.S.C. 154(b) by 319 days.

(21) Appl. No.: 11/719,919

(22) PCT Filed: Nov. 21, 2005

(86) PCT No.: PCT/IB2005/053836

§ 371 (c)(1),
(2), (4) Date: May 22, 2007

(87) PCT Pub. No.: WO2006/056928

PCT Pub. Date: Jun. 1, 2006

(65) Prior Publication Data
US 2007/0297199 A1 Dec. 27, 2007

(30) Foreign Application Priority Data
Nov. 29, 2004 (EP) .................................. 04106148

(51) Int. Cl.
*H02M 3/335* (2006.01)
*H02M 3/24* (2006.01)

(52) U.S. Cl. .......................................... 363/17; 363/98
(58) Field of Classification Search .................... 363/17, 363/21.02, 98, 131, 132
See application file for complete search history.

(56) References Cited

U.S. PATENT DOCUMENTS

| | | | | |
|---|---|---|---|---|
| 4,860,184 A | * | 8/1989 | Tabisz et al. | 363/17 |
| 5,479,337 A | * | 12/1995 | Voigt | 363/131 |
| 5,986,895 A | * | 11/1999 | Stewart et al. | 363/16 |
| 5,999,433 A | * | 12/1999 | Hua et al. | 363/132 |
| 6,344,979 B1 | | 2/2002 | Huang et al. | |
| 6,906,931 B1 | * | 6/2005 | Batarseh et al. | 363/17 |
| 2002/0012257 A1 | | 1/2002 | Takahama et al. | |

FOREIGN PATENT DOCUMENTS

| | | |
|---|---|---|
| JP | 2002325445 A | 11/2002 |
| JP | 2003134817 A | 5/2003 |
| WO | WO2004038900 A2 | 4/2004 |

* cited by examiner

*Primary Examiner*—Jessica Han

(57) ABSTRACT

In a multi-resonance converter for converting a first DC voltage into a second DC voltage, wherein the output of a half-bridge comprising semiconductor switches is connected through a resonance capacitor to the primary winding of a transformer and the secondary winding of the transformer, together with rectifier elements, an output inductor and an output capacitor, forms a current output, it is proposed that a controller, which can be supplied which the voltage across the output capacitor and a reference voltage, should control the semiconductor switches alternately so that one of the semiconductor switches is respectively turned on at a predetermined time after the other semiconductor switch is turned off. Preferably, the frequency is controlled in an upper range of the drawn power while in a lower range of the drawn power, the mark-space ratio is controlled for selected respectively constant frequencies.

10 Claims, 2 Drawing Sheets

MULTI-RESONANCE CONVERTER

The invention relates to a multi-resonance converter for converting a first DC voltage into a second DC voltage, wherein the output of a half-bridge comprising semiconductor switches is connected through a resonance capacitor to the primary winding of a transformer and the secondary winding of the transformer, together with rectifier elements, an output inductor and an output capacitor, forms a current output.

For the electrical power supply of liquid-crystal display screens in television sets and computers, circuits which satisfy various requirements are necessary. Besides a stable output voltage for a large load range and in the event of a fluctuating input voltage, a maximum efficiency is also required. This applies in particular to standby operation in which, for example, a power of only 500 mW is drawn from the circuit. Electromagnetic compatibility requirements must also be taken into account. Multi-resonance converters suitable in principle for this are described, for example, in R. W. Erickson, D. Maksimovic, Fundamentals of Power Electronics, Second Edition 2001. However, the known circuits do not satisfy all the aforementioned requirements, and in particular do not satisfy the requirement for a low current consumption during standby operation of the connected device.

The multi-resonance converter according to the invention is characterized in that a controller, which can be supplied with the voltage across the output capacitor and a reference voltage, controls the semiconductor switches alternately so that one of the semiconductor switches is respectively turned on at a predetermined time after the other semiconductor switch is turned off. In the converter according to the invention, in particular, the frequency is controlled in an upper range of the drawn power and/or the mark-space ratio is controlled for selected respectively constant frequencies in a lower range of the drawn power.

The resonance converter according to the invention is distinguished by the following advantages:
- the current output permits a very small and therefore inexpensive output capacitor,
- under normal operating conditions, the mark-space ratio of the converter according to the invention is always 50%, which minimizes the size of the output inductor required,
- the converter according to the invention allows the semiconductor switches to be switched when the voltage crosses zero, which minimizes losses and the outlay on EMC filters,
- the combined frequency and mark-space ratio control minimizes both the required frequency range and the current surge when switching on,
- switching when the voltage crosses zero, together with the high efficiency and possibility of synchronous rectification, makes the converter easy to scale over a wide power range so that devices of different powers can be supplied using a circuit which is fundamentally the same,
- switching when the voltage crosses zero and the high efficiency makes it particularly favorable to use the converter for very compact radiofrequency devices.

A particularly advantageous embodiment allows favorable operation of the converter according to the invention with the smallest drawn powers if in the lower power range, the periods for the selected frequencies are given by $T1p=(n+½)*T0$, where n is an integer depending on the drawn power and T0 is the period of the oscillation, the frequency of which is dictated by the resonance capacitor and the series circuit of the stray inductance and the main inductance of the transformer.

In one preferred configuration of the converter, the controller is formed by a programmable device, in which a period is derived as a function of the voltage across the output capacitor and the reference voltage, the derived period is compared with periods of the maximum frequency and the selected frequencies, and the control signals supplied to the semiconductor switches are derived as a function of the frequency and the mark-space ratio.

Furthermore, particularly soft current commutation is achieved in the converter according to the invention if the secondary winding has a center tap and the ends of the secondary winding are respectively connected to a rectifier element. These may be rectifier diodes—as represented in the exemplary embodiment—or semiconductor switches controlled by the polarity of the respectively applied voltage, in particular MOSFETs. The latter are also referred to as synchronous rectifiers.

These and other aspects of the invention are apparent from and will be elucidated with reference to the embodiments described hereinafter.

Figure 1:
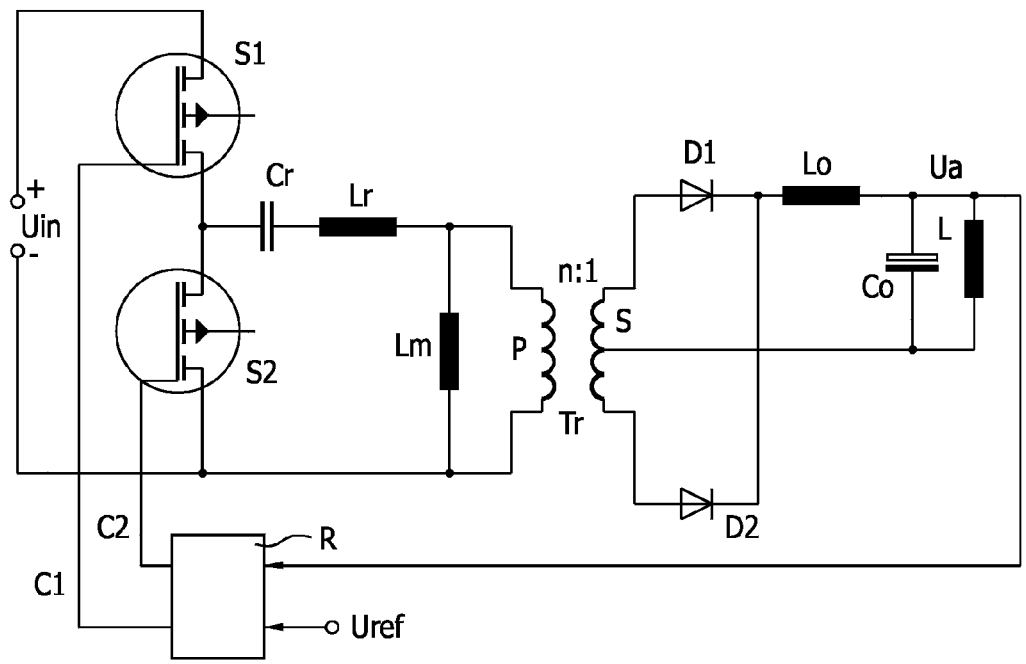
FIG. 1 shows a circuit arrangement of a converter according to the invention.

In the circuit arrangement according to FIG. 1, two field-effect transistors S1 and S2 form a half-bridge which is controlled by a controller R and to which a DC voltage Uin is applied. When the converter according to the invention is used as a power supply unit, it should be preceded by a suitable rectifier.

The connection point of the two field-effect transistors S1 and S2 forms the output of the half-bridge and is connected through a resonance capacitor Cr to the primary winding P of the transformer Tr. To explain the function of the circuit, the stray inductance Lr and the main inductance Lm are represented independently, although separate components are not provided for them in the circuit.

The secondary winding S has a center tap, while the ends of the secondary winding S are respectively connected through a rectifier diode D1, D2 and an output inductor Lo to an output capacitor Co, and therefore to the load L. The output inductor Lo has an inductance high enough for a current to be impressed on the load L. The output voltage Ua, however, is kept substantially constant by the control described in connection with FIGS. 2 and 3.

The controller R generates a respective control signal C1, C2 for the field-effect transistors S1 and S2. The switching times differ from each other insofar as one of the field-effect transistors is turned off first and the other field-effect transistor is turned on at a predetermined time later. A compensating current can flow through the output capacitors (not shown in the figure) and optionally through snubber capacitors and body diodes. The resonance frequency is given as $f0=1/T0=1/[(Lr+Lm)*Cr]^{1/2}$, for example 150 kHz.

Figure 2:
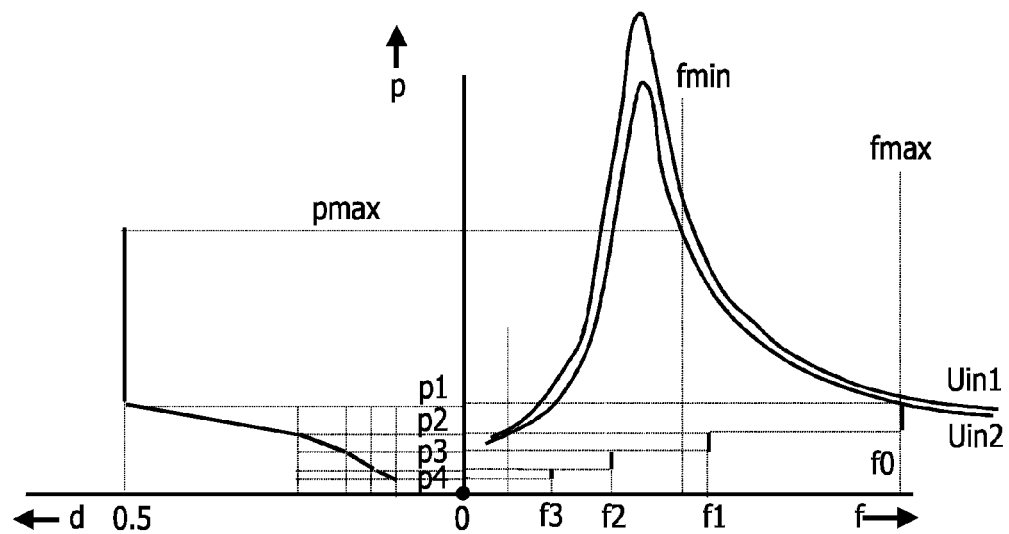
FIG. 2 shows diagrams to explain the way in which the converter according to the invention is controlled.
Figure 3:
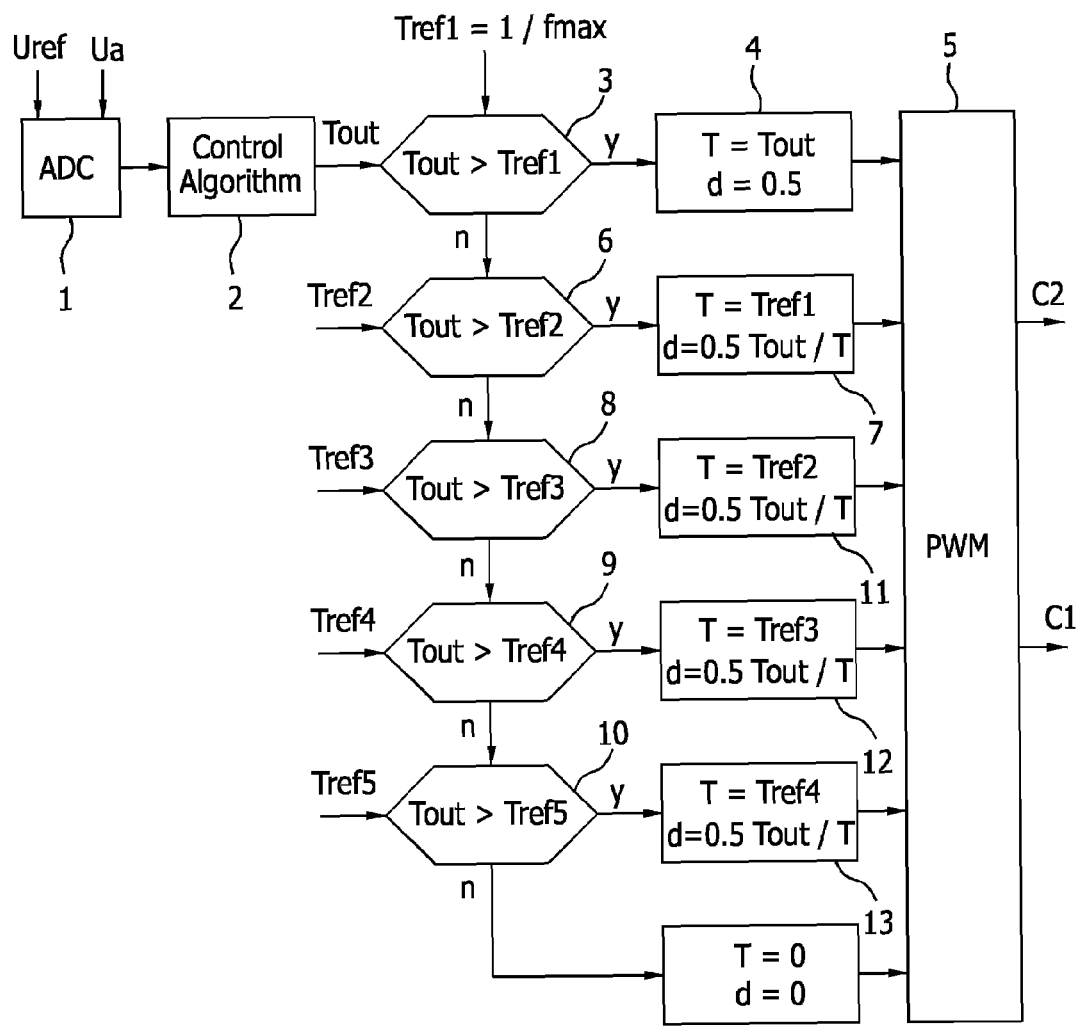
FIG. 3 shows a diagram to explain the design of a controller for the converter according to the invention.

During operation in an upper power range between pmax and p1, the converter is driven as a conventional multi-resonance converter (FIG. 2), with the mark-space ratio being d=0.5 and the frequency rising from fmin to fmax. In FIG. 2, the profile of the frequency f as a function of the power output p is represented for two different input voltages Uin1, Uin2. In this case, the input voltage Uin1 is greater than the input voltage Uin2.

For power consumptions which are less than p1, the converter is controlled both via the frequency f and via the mark-space ratio d. In this case, discrete frequencies are selected. The corresponding periods T1$p$ are calculated as follows: T1$p$=(n+½)*T0. Here, the index 1$p$ denotes the operating mode in the lower power range.

For n=0, 1, 2 and 3, frequencies f0, f1, f2 and f3 represented by vertical lines in FIG. 2 are obtained. While the frequency is kept constant at the value f0 in the power range between p1 and p2, the mark-space ratio decreases continuously. When the power decreases further between p2 and p3, the frequency is set to f1, while the mark-space ratio decreases further, and so on. For a minimal power consumption, i.e. when a connected device is operated in standby, d assumes a minimal value which ensures that the efficiency remains high even at very small power consumption.

The controller R (FIG. 1) is preferably formed essentially by a microprocessor. An explanation of the functionality of the controller can be found in FIG. 3. The output voltage Ua and the reference voltage Uref are supplied to an analog/digital converter 1. As a function of the output signals of the analog/digital converter 1, a period Tout is calculated with the aid of a control algorithm. This is compared at 3 with the period Tref1=1/fmax. If Tout is the larger, then the converter works in an upper power range. The mark-space ratio is therefore set to 0.5 at 4. Together with T=Tout, d=0.5 is used as the input value of a pulse-width modulator 5. Control signals C1 and C2 are derived according to these specifications.

If Tout is not larger than Tref1, however, then Tout is compared with Tref2 at 6. This period corresponds to a frequency of, for example, 97 kHz. Correspondingly, at 7, the period of the control signals C1 and C2 is set to T=Tref1 and the mark-space ratio is set to d=0.5 Tout/T. In this case, the converter operates in the range represented in FIG. 2 between the drawn powers p1 and p2. At 8, 9 and 10, a comparison is respectively carried out with a further reference period Tref3, Tref4 and Tref5. In the example represented, Tref3=⅙₆ kHz and Tref4=½₂ kHz. T and d are calculated accordingly at 11, 12, 13.

If Tout is less than a further threshold value Tref5, the control signals C2 and C1 are turned off entirely at 14, i.e. d=0.

The invention claimed is:

1. A multi-resonance converter, for converting a first DC voltage into a second DC voltage, the convertor comprising:
a half-bridge including two semiconductor switches and having an output formed by a connection point of the two semiconductor switches;
a resonance capacitor;
a transformer having a primary winding and a secondary winding, the output of the half-bridge connected to the primary winding through the resonance capacitor;
two rectifier elements;
an output inductor, the secondary winding connected to the output inductor through the two rectifier elements;
an output capacitor connected to the two rectifier elements through the output inductor; and
a controller configured to be supplied with a voltage across the output capacitor and a reference voltage, the controller further configured to control switching of the semiconductor switches alternately so that one of the semiconductor switches is respectively turned on at a predetermined time after the other semiconductor switch is turned off, and
characterized in that in a lower range of power drawn from the converter, a mark-space ratio of the converter is controlled for selected respectively constant frequencies, the periods for the selected frequencies given by T1$p$=(n+½)*T0, where n is an integer depending on the drawn power and T0 is the period of the oscillation, the frequency of which is dictated by the resonance capacitor and the series circuit of a stray inductance and a main inductance of the transformer.

2. A converter as claimed in claim 1, wherein the controller is further configured to generate respective control signals responsive to the voltage across the output capacitor and the reference voltage, and to provide the respective control signals to the semiconductor switches to control switching of the semiconductor switches.

3. A converter as claimed in claim 1, wherein the second DC voltage is the voltage across the output capacitor.

4. A converter as claimed in claim 1, wherein the secondary winding of the transformer has a center tap that is connected to the output capacitor.

5. A converter as claimed in claim 1, wherein the two rectifier elements are diodes and the secondary winding of the transformer has a center tap and ends, each of the ends of the secondary winding respectively connected to one of the diodes.

6. A multi-resonance converter, for converting a first DC voltage into a second DC voltage, the convertor comprising:
a half-bridge including two semiconductor switches and having an output formed by a connection point of the two semiconductor switches;
a resonance capacitor;
a transformer having a primary winding and a secondary winding, the output of the half-bridge connected to the primary winding through the resonance capacitor;
two rectifier elements;
an output inductor, the secondary winding connected to the output inductor through the two rectifier elements;
an output capacitor connected to the two rectifier elements through the output inductor; and
a controller configured to be supplied with a voltage across the output capacitor and a reference voltage, the controller further configured to control switching of the semiconductor switches alternately so that one of the semiconductor switches is respectively turned on at a predetermined time after the other semiconductor switch is turned off, and
characterized in that the controller is a programmable device configured to derive a period as a function of the voltage across the output capacitor and the reference voltage, to compare the derived period with periods of a maximum frequency and selected frequencies, and to supply control signals to the semiconductor switches as a function of frequency and mark-space ratio.

7. A converter as claimed in claim 6, wherein the controller is further configured to generate respective control signals responsive to the voltage across the output capacitor and the reference voltage, and to provide the respective control signals to the semiconductor switches to control switching of the semiconductor switches.

8. A converter as claimed in claim 6, wherein the second DC voltage is the voltage across the output capacitor.

9. A converter as claimed in claim 6, wherein the secondary winding of the transformer has a center tap that is connected to the output capacitor.

10. A converter as claimed in claim 6, wherein the two rectifier elements are diodes and the secondary winding of the transformer has a center tap and ends, each of the ends of the secondary winding respectively connected to one of the diodes.

* * * * *